United States Patent
Choudhury et al.

(10) Patent No.: US 11,853,735 B1
(45) Date of Patent: Dec. 26, 2023

(54) SYSTEMS AND METHODS FOR CONTINUOUS INTEGRATION AND CONTINUOUS DEPLOYMENT PIPELINE MANAGEMENT USING PIPELINE-AGNOSTIC NON-SCRIPT RULE SETS

(71) Applicant: Citibank, N.A., New York, NY (US)

(72) Inventors: Tridib Choudhury, Kolkata (IN); Manish Shah, Flower Mound, TX (US); Satish Chandreskharan, Frisco, TX (US); Robert Kovach, Jersey City, NJ (US); Shweta Sobat, Frisco, TX (US); Arunkumar Saripalli, Frisco, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/167,739

(22) Filed: Feb. 10, 2023

(51) Int. Cl.
  *G06F 8/54* (2018.01)
  *G06F 8/60* (2018.01)
  *G06F 9/54* (2006.01)
  *H04L 9/40* (2022.01)
  *G06F 11/36* (2006.01)
  *G06F 16/25* (2019.01)

(52) U.S. Cl.
  CPC .............. *G06F 8/60* (2013.01); *G06F 9/54* (2013.01); *H04L 63/0263* (2013.01); *G06F 11/3664* (2013.01); *G06F 11/3668* (2013.01); *G06F 11/3672* (2013.01); *G06F 16/254* (2019.01)

(58) Field of Classification Search
  CPC ............. H04L 12/2807; H04L 12/2803; H04L 12/282; H04L 12/2809; H04L 41/12
  See application file for complete search history.

(56) References Cited

U.S. PATENT DOCUMENTS

| | | | |
|---|---|---|---|
| 2018/0011695 A1* | 1/2018 | Raman | G06F 11/3604 |
| 2022/0058112 A1* | 2/2022 | Lim | G06F 11/3684 |
| 2022/0121689 A1* | 4/2022 | James | G06F 16/24534 |
| 2022/0215303 A1* | 7/2022 | Thiruvengadathan | G06F 16/245 |
| 2023/0080597 A1* | 3/2023 | Krebs | G06F 9/45512 707/602 |

* cited by examiner

*Primary Examiner* — Tom Y Chang
(74) *Attorney, Agent, or Firm* — Perkins Coie LLP

(57) ABSTRACT

The systems and methods provide continuous integration and continuous deployment pipeline management using pipeline-agnostic rule sets applied to pre-deployment code samples. The system standardizes the application of a rule set to a pre-deployment code sample to use data at a given location, but the system allows for the sample itself to determine which data stream of the data streams at that data location is used. As such, the systems and methods avoid the need for the plethora of rule sets that would overwhelm a user and defeat the purpose of the CaaS product, but the system allows for processing pre-deployment code samples that are specific to the sample.

18 Claims, 4 Drawing Sheets

SYSTEMS AND METHODS FOR CONTINUOUS INTEGRATION AND CONTINUOUS DEPLOYMENT PIPELINE MANAGEMENT USING PIPELINE-AGNOSTIC NON-SCRIPT RULE SETS

BACKGROUND

In software development, code often requires review according to one or more rule sets prior to the code being published and/or deployed. For example, releases of new applications may need to be validated against various controls related to cybersecurity, risk analysis, and/or system auditing. Failure to properly validate new applications could potentially impair the system, expose the system to security threats, and/or otherwise cause unexpected issues.

In conventional systems, these controls are defined as rules written directly into the script of the application code. As such, each time a new application, production release, and/or other data is created, these rules are validated to determine whether to allow the application, production release, and/or other data to proceed to the system at large. Because these rules are dynamic and may be changed at any time, managing these rules is a significant burden. Furthermore, as any updates to these rules require modifications to the application code itself, any modification requires careful review of application code to determine whether the application code is affected by the modification, precise edits (in one or more programming languages) to the application code to capture the modification, and copious amounts of testing prior to re-deployment of the application code to ensure the modification works as expected.

SUMMARY

Systems and methods described herein recite improvements to this process. Specifically, the systems and methods recite improvement for continuous integration and continuous deployment pipeline management that avoids the use of rules written directly into the script of the application code. For example, as opposed to relying on script-based rules, the systems and methods analyze code samples using a rules engine that is populated by rule sets generated using a Controls as a Service (CaaS) system. As the rule sets are kept separate from the code itself, any modifications to the rule sets do not need to affect the code. That is, new rules may be applied to pre-deployment code samples without requiring modifications to the code. Because the code does not require modification, these modifications may be instituted without reviewing the application code to determine whether the application code is affected by the modification, without requiring precise edits to the application code to capture the modification, and without copious amounts of testing prior to re-deployment of the application code.

Furthermore, the system comprises a front-end web user interface that connects with standard software development lifecycle (SDLC) tools to allow new rule sets, and modifications to existing rule sets, to be generated via the user interface. The front-end web user interface may use a series of pre-generated code templates and/or guidance that correspond to one or more rules. As such, a user may generate rule sets without a comprehensive knowledge of software development, programming languages, and/or existing scripts in the code samples. However, pre-rendering such a substantial part of the rule set creates a novel technical challenge. In particular, many rule sets rely on an external database or data streams to provide information used to apply the rule set. In a conventional system, these data streams would be identified by the script as part of the rule set and would be updated with the rule set.

As such, one solution to overcoming this technical challenge using the aforementioned systems and methods would be to have the rule sets identify the data streams. However, data streams are typically unique to the code samples (or at least code samples may rely on different data streams) and/or are specified by the applications (or functions of the applications) comprising the code samples. That is, the data streams correspond to the type of code or application as opposed to the rule set. Because of this, rule sets that rely on external data streams would need to be unique for each application, code sample, and/or function requiring a particular data stream. Such a plethora of rule sets would overwhelm a user and defeat the purpose of the CaaS product.

An alternative approach would be to have the user define the data streams when generating the rule set. However, the user generating a standardized rule set is unlikely to know the specific data stream necessary for the code sample. Additionally, the creator of the code sample (e.g., the user with the knowledge of software development, programming languages, and/or existing scripts in the code samples) likely has the best knowledge of what the data streams should be and is likely in the best position to include this information in the rule set.

In view of this technical challenge, and in order to enable the functionality and ease of use of the CaaS system through a web interface, the systems and methods provide rule sets with a specialized data retrieval process in which the rule set includes a source identifier for a data source for the first rule set, but the system then selects a data stream from a plurality of data streams at that data source for processing the pre-deployment code sample. For example, the system may include an additional layer (e.g., an application programming interface (API) suite that comprises one or more APIs) of functionality that interprets a source identifier included in a rule set based on the specific code sample. By doing so, the system standardizes the application of a rule set to a pre-deployment code sample to use data at a given location, but the system allows for the sample itself to determine which data stream of the data streams at that data location is used. For example, the rule set may define a category of the data streams, but the specific data stream within that category is selected based on the code sample. As such, the systems and methods avoid the need for the plethora of rule sets that would overwhelm a user and defeat the purpose of the CaaS system, but the system allows for processing pre-deployment code samples that are specific to the sample. As such, the systems and methods provide continuous integration and continuous deployment pipeline management using pipeline-agnostic rule sets applied to pre-deployment code samples.

In some aspects, systems and methods are described for continuous integration and continuous deployment pipeline management using pipeline-agnostic rule sets applied to pre-deployment code samples. For example, the system may receive, via a first user interface, a first user input creating a first rule set for processing pre-deployment code samples. The system may store, in a rules engine, the first rule set. The system may receive a first request to process a first pre-deployment code sample using the first rule set. The system may, in response to the first request: retrieve, based on the first rule set, a first source identifier indicating a first data source location for the first rule set; and select, from a plurality of data streams at the first data source location, a first data stream based on the first data stream corresponding to the first pre-deployment code sample. The system may process the first pre-deployment code sample using the first rule set and the first data stream. The system may generate for display, on a second user interface, a first processing confirmation for the first pre-deployment code sample.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
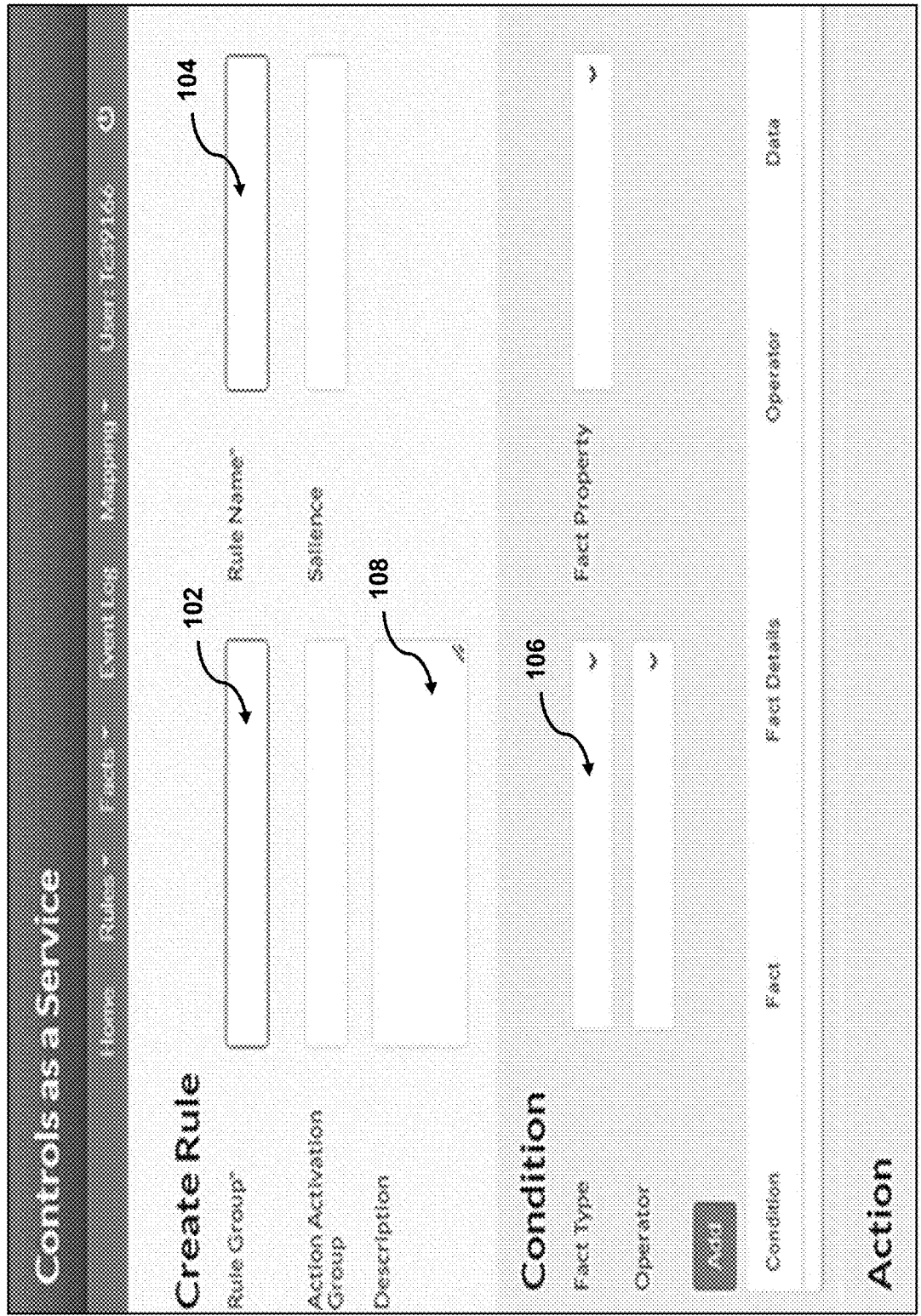
FIG. 1 shows an illustrative diagram for a user interface for a continuous integration and continuous deployment pipeline management system, in accordance with one or more embodiments.

FIG. 1 shows an illustrative diagram for a user interface for a continuous integration and continuous deployment pipeline management system, in accordance with one or more embodiments. As referred to herein, a "user interface" may comprise a human-computer interaction and communication in a device, and may include display screens, keyboards, a mouse, and the appearance of a desktop. For example, a user interface may comprise a way a user interacts with an application or a website. The user interface may present content related to continuous integration and/or continuous deployment. Continuous integration is focused on automatically building and testing code, as compared to continuous deployment, which automates the entire software release process up to production. The system described herein may perform one or more of these activities. In some embodiments, continuous integration improves collaboration throughout the development process, while continuous deployment uses automation to streamline testing, staging, and validation so that code is deployable at the push of a button.

For example, continuous integration may pull together all commits (e.g., pre-deployment code samples) within a single codebase. For example, the codebase may comprise a secure, highly scalable, and/or managed source control service that hosts private Git repositories. The codebase may comprise a source control system that stores data. The system may integrate continuously with a code repository of deployed code, even if multiple developers are working on the same code simultaneously. The system may automatically pull commits through the pipeline—building, testing, and packaging for deployment. Once ready, the system may manually or automatically determine to deploy code after testing, staging, and/or validating the code.

To provide one or more of these functions, the system may present and/or allow a user to interact with content. As referred to herein, "content" should be understood to mean an electronically consumable user asset, such as Internet content (e.g., streaming content, downloadable content, webcasts, etc.), video clips, audio, content information, pictures, rotating images, documents, playlists, web sites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

FIG. 1 shows user interface 100. For example, the system may receive, via user interface 100, a first user input creating a first rule set for processing pre-deployment code samples, wherein the first user input is entered into a first field of a plurality of fields. For example, the system may receive a user input into field 102 (e.g., which may refer to a rule group) and/or field 104 (e.g., which may refer to a rule name). In response to the user input, the system may determine additional details for a rule. For example, a user input into field 102 may cause the system to generate and/or select from a plurality of pre-set rule groups. The system may then receive a user input selecting a specific rule from the rule group. Additionally or alternatively, the system may receive a user input of a specific rule name (e.g., into field 104).

For example, a rule set may comprise a unique name for the rule that may comprise one or more letters (A-Z, a-z), digits (0-9), and underscores (_). The rule set may comprise a description of the rule set (e.g., as populated into field 108) as well as one or more variables. In some embodiments, the variables may include a first source identifier indicating a first data source location for the first rule set. The data source location may comprise a group or category of data streams that may be used by a code sample when testing, staging, and/or validating the code.

User interface 100 may allow a user to access pending rule set processing requests as well as rule sets (e.g., versions of rule sets, groups of rule sets, etc.). Additionally, user interface 100 may allow a user to open and/or review a pending rule set processing request. Once a rule set processing request is opened, a reviewer (e.g., a human reviewer and/or automation tool) may analyze and/or review the potential changes to rule sets and/or pre-deployment code samples with users and update code samples prior to the code samples being merged into the codebase. User interface 100 may also provide options for obtaining feedback and/or data analytics at a group rule set level.

User interface 100 may also allow a user to select one or more conditions and/or actions. For example, each rule in a rule set must have a condition. A condition may include one or more condition expressions organized into one or more groups. The condition may indicate a circumstance for executing a rule in a rule set. Additionally or alternatively, a rule may include an action for a condition. For example, an action may include one or more action statements that assign a value to a property as a consequence of a condition expression evaluating to true or false. For example, each rule in a rule set may contain one or more conditions to test and/or one or more actions to execute when one or more of the conditions are satisfied. The system may receive a condition via field 106.

As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment.

The system may also generate one or more processing confirmations and/or other content related to the testing, staging, and/or validation of the code. For example, a processing confirmation may confirm that a code sample met (or did not meet) the conditions and/or requirements of a rule set during the testing, staging, and/or validation of the code. In some embodiments, the processing confirmation may include additional information related to the testing, staging, and/or validation of the code such as additional information required, specific approvals, additional steps in a pipeline, etc., in the testing, staging, and/or validation of the code.

Figure 2:
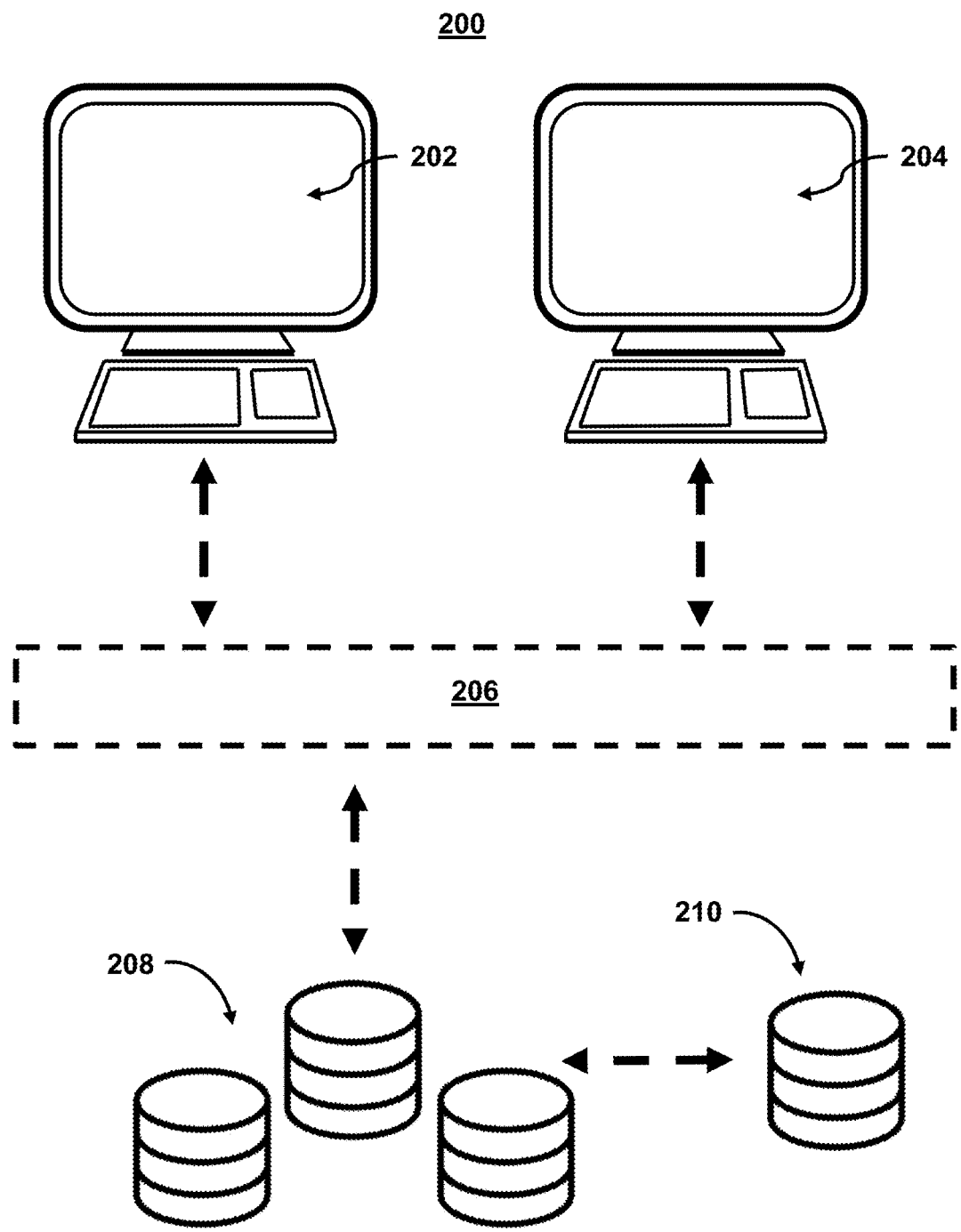
FIG. 2 shows an illustrative diagram comprising system components for a user interface for a continuous integration and continuous deployment pipeline management system, in accordance with one or more embodiments.

FIG. 2 shows an illustrative diagram comprising system components for a user interface for a continuous integration and continuous deployment pipeline management system, in accordance with one or more embodiments. For example, a user interface on user device 202 may display a plurality of options for generating a rule set. The generated rule set may then be submitted to a rules engine (e.g., rules engine 208) across API suite 206.

The rules engine may then receive pre-deployment code samples from respective code contributors (e.g., submitted via a software developer via user device 204). The system may receive a plurality of rule set processing requests that are for testing, staging, and/or validating of pre-deployment code samples that are being committed to an external source code repository (e.g., database 210) and are awaiting inclusion in a source code repository of the source code of the system.

System 200 also includes API suite 206. API suite 206 may allow the system to generate summaries across different devices. In some embodiments, API suite 206 may be implemented on user device 202 or user device 204. Alternatively or additionally, API suite 206 may reside on one or more cloud components. For example, API suite 206 may comprise a system featuring a separate rules engine from a front-end web user interface that connects with SDLC tools. API suite 206 may function to allow business and risk employees to write rules in an English language to warn application developers of vulnerabilities in their code and to block their code altogether, preventing those vulnerabilities from getting into a wider code set. API suite 206 may force application teams to mitigate identified risks and vulnerabilities in their code, or their builds will be prevented from completing successfully. Furthermore, API suite 206 may allow for continuous updates that add the capability to either mitigate or prevent a new type of vulnerability.

For example, while conventional coding was done directly into the pipeline to prevent vulnerabilities in code, this led to longer development times. API suite 206 may allow the adoption of new pipelines in such a manner that the roles do not have to be re-coded, but the roles can be automatically inserted into a new pipeline (e.g., saving development time). As such, API suite 206 is pipeline agnostic (e.g., can work with any pipeline), comprises easy-to-change pipelines, and/or allows for rules to be written at any time, in an English-like format, without having to translate into code or follow an SDLC release cycle (assuming an existing data source). API suite 206 may prevent the build or the deployment (environment released to like production) of the code based on the rules created and approved in API suite 206.

API suite 206 (which may be a Representational State Transfer (REST) or Web services API layer) may provide a decoupled interface to data and/or functionality of one or more applications. API suite 206 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 206 may be programming language-dependent or language-independent. For example, requests via an API function call to rules engine 208 may be made in a particular language or format, e.g., hypertext transfer protocol (HTTP) or Extensible Markup Language (XML), while responses to requests may be made in the same or a different language or format, e.g., REST (with XML) or JavaScript Object Notation (JSON). In some embodiments, API suite 206 may send requests via one or more APIs in API suite 206. Requests may be made in any suitable format, e.g., HTTP, and may include requests for authentication, requests for searching rules engine 208, requests for accessing database 210, requests for viewing or updating a rule or rules set, requests for creating a new rule set, and/or requests for updating a source identifier, a data source location, or how a data stream identifier in a code sample is interpreted. Additionally or alternatively, user device 202 and/or user device 204 may send requests via API layer 206. Similar to above, these requests may be made in any suitable format, e.g., HTTP, and may include requests for authentication, requests for searching rules engine 208, requests for accessing database 210, requests for viewing or updating a rule or rules set, requests for creating a new rule set, and/or requests for updating a source identifier, a data source location, or how a data stream identifier in a code sample is interpreted.

In some embodiments, APIs for API layer 206 are a set of "allowable" HTTP request messages and a suitably defined set of responses. The responses may be sent in any suitable language, e.g., REST with XML or JSON. Programming references for these languages are readily available, and those skilled in the art will appreciate their availability. In some embodiments, the API layer 206 allows for a number of requests from a given device, entity, etc. For instance, a user device (e.g., user device 202) may be able to search for, view, create, and edit registries via API function calls to API layer 206 based on specific authorization for that device.

In some embodiments, each request made via API layer 206 must be authenticated. An API request may also be referred to as an API function call. This authentication may be performed in any suitable manner, e.g., using a client-server public-private key system, e.g., by computing a digital signature using the HMAC-SHA1 signature method. For instance, requests made by API layer 206, rules engine 208, and/or a user device may be authenticated by computing a digital signature using the HMAC-SHA1 signature method. To carry out such authentication, each request may include fields such as api_key (a public key provided to API layer 206, rules engine 208, and/or a user device that allows the API to know its identity), api_sig (e.g., an HMAC-SHA1 signature of the request that is generated by API layer 206, rules engine 208, and/or a user device using their private key), nonce (a unique random ID generated by the API layer 206 or the user device to identify their request), and date (the date and/or time when the request is made). In some embodiments, access to API layer 206, rules engine 208, and/or a user device may be restricted such that a user or device will only receive a public key and a private key string if the user or device has permission to make requests to API layer 206. The private key string may be used to digitally sign the API request and is not included in the API request. On the other hand, the public key is included in each API request so that API layer 206, rules engine 208, and/or a user device can determine, based at least in part on the digital signature of the API request, that the respective private key generated the API request.

In some embodiments, API layer 206, rules engine 208, and/or a user device may host a codebase and/or code repository, while another device may host a centralized codebase and/or code repository. The centralized codebase and/or code repository may include code available from multiple users, codebases, applications, source code contributions, etc.

There are several requests that can be made via an API to API layer 206, rules engine 208, and/or a user device. A "SEARCH" API request may be used to perform searches and query a centralized codebase or application-specific codebase for data that matches a specific request, rule identifier, etc. The details for such data may be retrieved with a request via the API. A SEARCH API request may include several fields and/or variables in any suitable format. For example, a SEARCH API request may include fields (variables) such as RN (rule name), RG (rule group), AIN (authentication information, e.g., a password associated with a respective API), etc. A "GET" API request may be used to obtain a complete collection of all rule sets of a specific type (e.g., corresponding to a given function, code sample, application, etc.). A "POST" API request may be used to add and/or update data located at, or accessible by, API layer 206, rules engine 208, and/or a user device. A POST API request may include fields (variables) such as RN (rule name), RG (rule group), AIN (authentication information, e.g., a password associated with a respective API), etc. Each of the above-described requests may require authentication by API layer 206, rules engine 208, and/or a user device, as described above. A "CREATE" API request may be used to create a rule set, a modification to a rule set, an identifier, a modification to an identifier, etc.

API suite 206 may use various architectural arrangements. For example, system 200 may be partially based on API suite 206, such that there is strong adoption of SOAP and RESTful Web services, using resources like Service Repository and Developer Portal, but with low governance, standardization, and separation of concerns. Alternatively, system 200 may be fully based on API suite 206, such that separation of concerns between layers like API suite 206, services, and applications are in place.

In some embodiments, the system architecture may use a microservice approach. Such systems may use two types of layers: front-end layer and back-end layer, where microservices reside. In this kind of architecture, the role of the API suite 206 may provide integration between front-end and back-end layers. In such cases, API suite 206 may use RESTful APIs (exposition to front-end or even communication between microservices). API suite 206 may use AMQP (e.g., Kafka, RabbitMQ, etc.). API suite 206 may use incipient usage of new communications protocols such as gRPC, Thrift, etc.

In some embodiments, the system architecture may use an open API approach. In such cases, API suite 206 may use commercial or open source API platforms and their modules. API suite 206 may use a developer portal. API suite 206 may use strong security constraints applying WAF and DDoS protection, and API suite 206 may use RESTful APIs as standard for external integration.

API suite 206 may streamline communications between components in system 200 in order to provide testing, staging, and validation of code samples. API suite 206 may include one or more individual APIs that transmit data and/or provide one or more specific functions. In particular, API suite 206 may perform the function of selecting, from a plurality of data streams at the data source location, a data stream based on the first data stream corresponding to a first data stream identifier in the first pre-deployment code sample. For example, API suite 206 may detect a data stream identifier present in script of a pre-deployment code sample. API suite 206 may then select a data stream for testing, staging, and validation of code samples from a plurality of data streams available at a data source location (and/or identified by a rule set or source identifier in a rule set).

For example, API suite 206 may comprise a plurality of types of data structures or data models used to select, from a plurality of data streams at a data source location, a data stream based on the first data stream corresponding to a data stream identifier in the first pre-deployment code sample. One such data structure may be a hierarchical data structure. A hierarchical data structure may comprise a data model in which the data is organized into a tree-like structure. The data may be stored as records that are connected to one another through links. A record is a collection of fields, with each field containing only one value. The type of a record defines which fields the record contains. For example, in the hierarchical data structure, each child record has only one parent, whereas each parent record can have one or more child records.

Each record may act as a node. In some cases, the node may be a structure node. For example, the structure node may be a basic unit of a data structure, such as a link between one or more structures. Each structure node may contain data and also may link to other nodes. For example, the integrated structure may be represented by a non-linear data structure of nodes and edges (e.g., a structure graph). In some embodiments, the system may implement links between nodes through pointers. Additionally, a structure node may be a node shared by one or more structures (e.g., a point of feature transformer data of a first structure and a second structure).

In response to a request to process a first pre-deployment code sample using the first rule set, API suite 206 may filter through the data structure to determine a data stream to use. For example, the system may indicate a specific data stream and/or data stream characteristic that is required to be applied by the rule set. As such, when determining, based on the first rule set, a source identifier indicating a first data source location for the rule set, the system may filter through the data structure. The system may then retrieve a database record, wherein the database record indicates a plurality of data streams that correspond to the source location. The system may determine a characteristic of the first pre-deployment code sample (e.g., a data stream identifier in the first pre-deployment code sample) and further filter the plurality of data streams based on the characteristic to select the data stream used for testing, staging, and/or validating the code.

Figure 3:
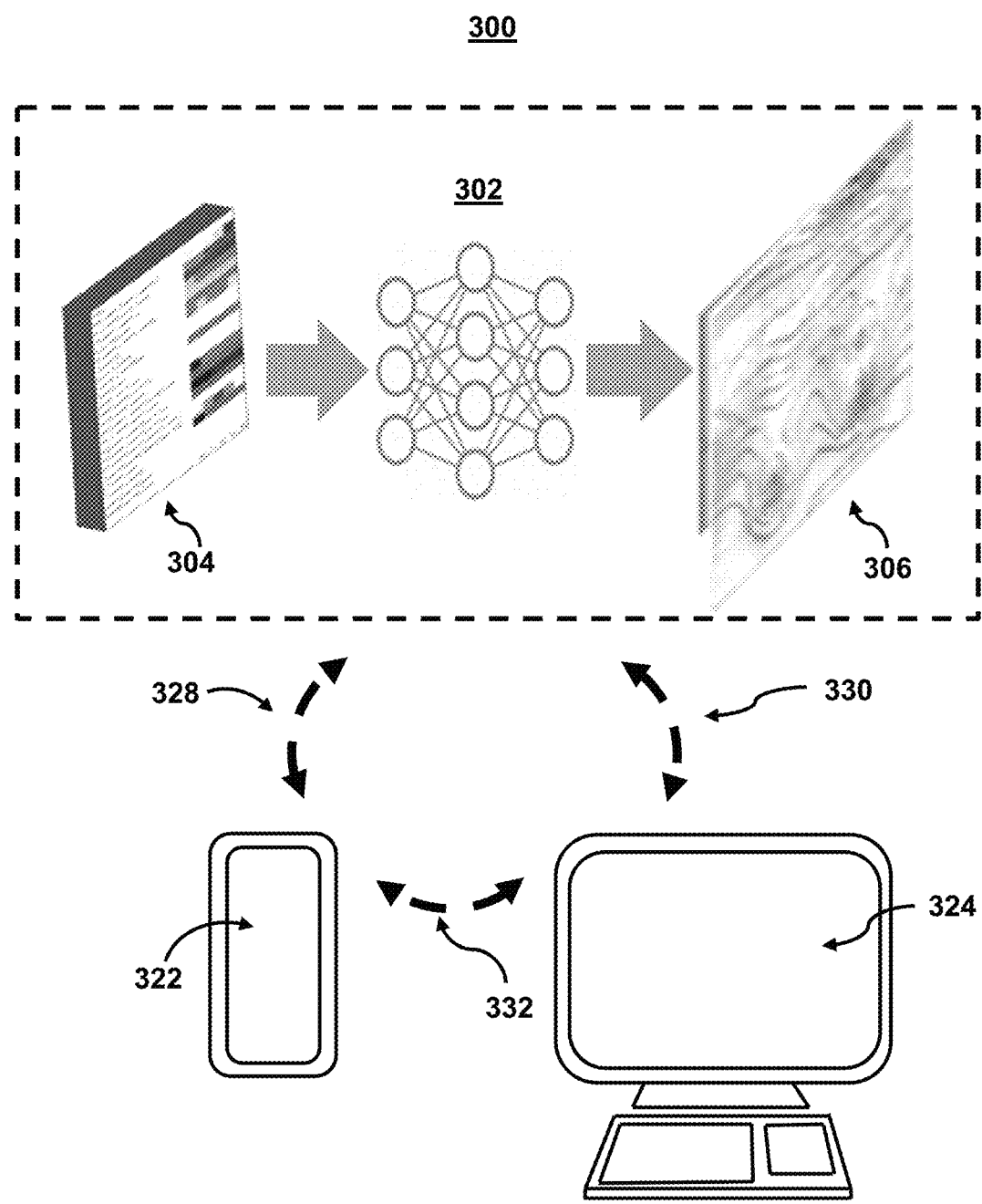
FIG. 3 shows illustrative components for a system used to apply pipeline-agnostic rule sets to pre-deployment code samples, in accordance with one or more embodiments.

FIG. 3 shows illustrative components for a system used to apply pipeline-agnostic rule sets to pre-deployment code samples, in accordance with one or more embodiments. For example, FIG. 3 may show illustrative components for a continuous integration and continuous deployment pipeline management system using pipeline-agnostic rule sets applied to pre-deployment code samples. As shown in FIG. 3, system 300 may include mobile device 322 and user device 324. While shown as a smartphone, respectively, in FIG. 3, it should be noted that user device 322 and user device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted that, while one or more operations are described herein as being performed by particular components of system 300, these operations may, in some embodiments, be performed by other components of system 300. As an example, while one or more operations are described herein as being performed by components of user device 322, these operations may, in some embodiments, be performed by cloud components. In some embodiments, the various computers and systems described herein may include one or more computing devices that are programmed to perform the described functions. Additionally or alternatively, multiple users may interact with system 300 and/or one or more components of system 300.

With respect to the components of user device 322 and user device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 322 and user device 324 include a display upon which to display data.

Additionally, as user device 322 and user device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes model 302, which may be a machine learning model, an artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a rule set, a rule group, a data source identifier, etc.). In some embodiments, the system may train the model to populate one or more fields (e.g., in user interface 100 (FIG. 1)), generate code for implementing a rule, and/or generate pseudocode for describing a rule set.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, the model (e.g., model 302) may automatically perform actions based on outputs 306. In some embodiments, the model (e.g., model 302) may not perform any actions. The output of the model (e.g., model 302) may be used to a rule set, a rule group, data source identifier, etc. In some embodiments, the system may train the model to populate one or more fields (e.g., in user interface 100 (FIG. 1)), generate code for implementing a rule, and/or generate pseudocode for describing a rule set.

As shown in FIG. 3, in some embodiments, model 302 may be trained by taking inputs 304 and providing outputs 306. Model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302 (e.g., a rule set, a rule group, a data source identifier, etc.). In some embodiments, the system may train the model to populate one or more fields (e.g., in user interface 100 (FIG. 1)), generate code for implementing a rule, and/or generate pseudocode for describing a rule set.

Model 302 is shown as a convolutional neural network. A convolutional neural network consists of an input layer (e.g., input 304), hidden layers, and an output layer (e.g., output 306). As shown in FIG. 3, the middle layers are called "hidden" because their inputs and outputs are masked by the activation function and final convolution. In a convolutional neural network, the hidden layers include layers that perform convolutions. Model 302 may comprise convolutional layers that convolve the input and pass its result to the next layer. Model 302 includes local and/or global pooling layers along with traditional convolutional layers. Pooling layers reduce the dimensions of data by combining the outputs of neuron clusters at one layer into a single neuron in the next layer. Also as shown, model 302 may comprise fully connected layers that connect every neuron in one layer to every neuron in another layer.

Figure 4:
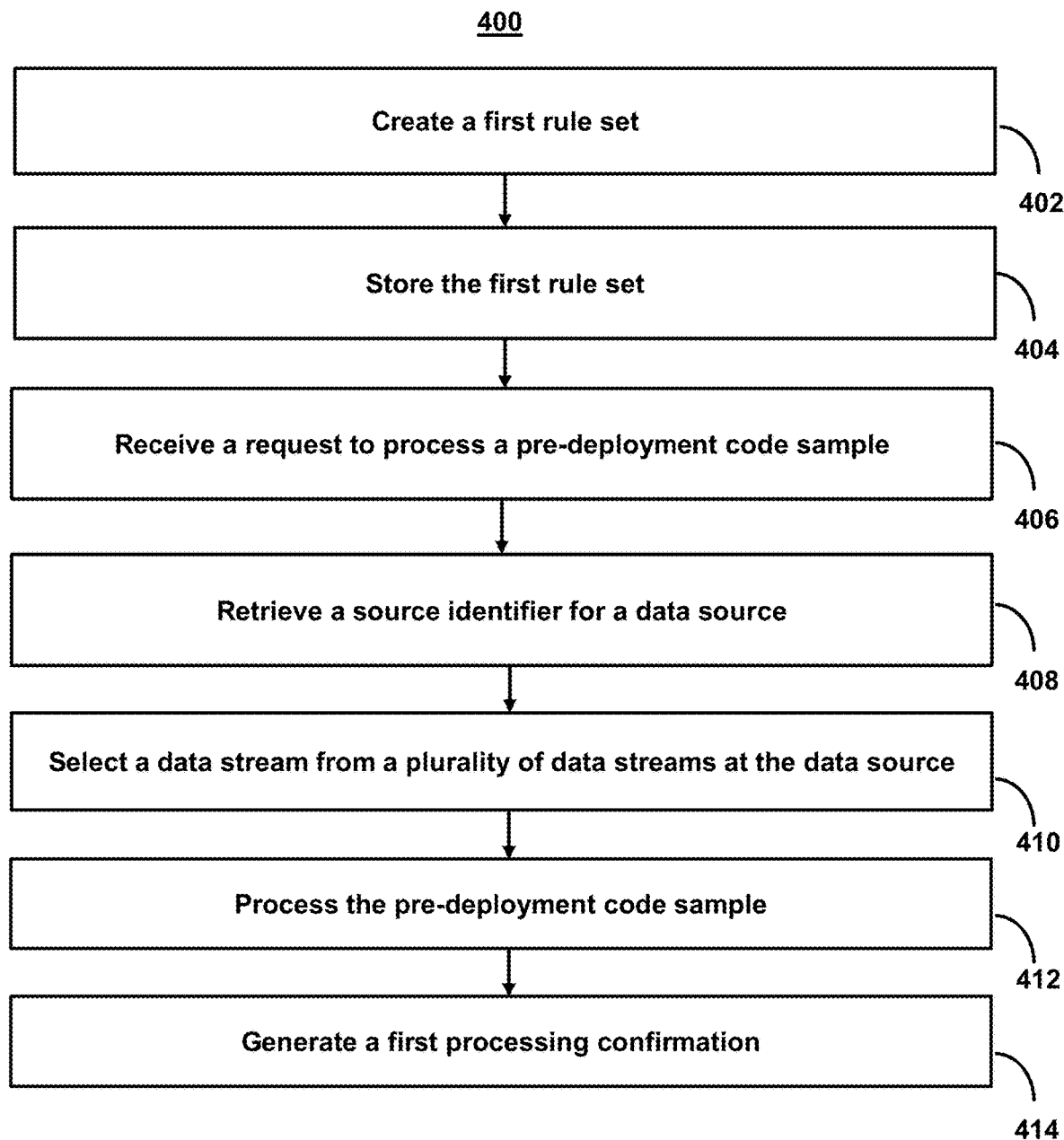
FIG. 4 shows a flowchart of the steps involved in continuous integration and continuous deployment pipeline management using pipeline-agnostic rule sets applied to pre-deployment code samples, in accordance with one or more embodiments.

FIG. 4 shows a flowchart of the steps involved in continuous integration and continuous deployment pipeline management using pipeline-agnostic rule sets applied to pre-deployment code samples, in accordance with one or more embodiments. For example, the system may use process 400 (e.g., as implemented on one or more system components described above) in order to apply pipeline-agnostic rule sets to pre-deployment code samples.

In some embodiments, the system uses pipeline-agnostic rule sets applied to pre-deployment code samples. For example, the system may comprise a CaaS system that may feature a separate rules engine with a front-end web user interface that connects with standard SDLC tools. The CaaS product interfaces with technology deployment processing tools for continuous integration and continuous deployment pipeline management in order to build code, run tests, and safely deploy new versions of code samples and/or applications. By doing so, the system may automate pipeline management to increase efficiency, remove manual errors, provide standardized feedback loops to developers, and/or enable faster product iterations.

At step 402, process 400 (e.g., using one or more components described above) creates a first rule set. For example, the system may receive, via a first user interface, a first user input creating a first rule set for processing pre-deployment code samples. By doing so, the system may provide an easy and intuitive mechanism to generate rule sets that does not require a user to have knowledge of existing scripts, programming languages, and/or software engineering skills.

At step 404, process 400 (e.g., using one or more components described above) stores the first rule set. For example, the system may store, in a rules engine, the first rule set. For example, the system may use a rules engine that hosts a plurality of rule sets that are accessed at run-time during validation of code samples. The rules engine may serve as a pluggable software component, which executes control rules that are externalized and/or otherwise separated from the application code. By doing so, the system allows users to modify the rules without the need for direct modification of (or knowledge of) the script in the codebase.

For example, the system may store numerous versions of the first rule. The system may select a version of the plurality of versions to use to process the code sample. In such cases, the system may store a plurality of versions of the first rule set in a database. The system may determine, in response to receiving the first request to process the first pre-deployment code sample using the first rule set, a first version of the plurality of versions. The system may use the first version to process the first pre-deployment code sample.

In some embodiments, the system may determine which version to use based on a characteristic of the code sample and/or the request. For example, the system may store a plurality of versions of the first rule set in a database. The system may determine, based on the first request, a first version of the plurality of versions to process the first pre-deployment code sample.

Additionally, as the rules engine stored the rules separately from the script, the system may receive updates to the rules engines (and/or versions of rule sets therein) while the system is processing one or more code samples. For example, the system may, while processing the first pre-deployment code sample, receive a version update to the first rule set and store, in the plurality of versions of the first rule set, a second version of the plurality of versions.

In some embodiments, the system (e.g., the rules engine) may await approval of a rule set and/or rule in the rule set. For example, upon storing a rule (e.g., in step 404), the system may apply one or more approval criteria to determine whether or not the rule set and/or rule is approved. In some embodiments, the system may await a manual review of a new rule set and/or rule. For example, the system may determine whether or not a user with a given role and/or credentials approves of the rule set and/or rule set. Upon receiving the approval, the system may allow the rules set and/or rule to be applied to one or more pre-deployment code samples.

At step 406, process 400 (e.g., using one or more components described above) receives a request to process a pre-deployment code sample. For example, the system may receive a first request to process a first pre-deployment code sample using the first rule set. The first request may represent a user submission of a code sample for validation. Alternatively, the first request may be generated automatically by the system during a workflow routine requiring validation (via application of one or more rule sets) of a pre-deployment code sample.

At step 408, process 400 (e.g., using one or more components described above) retrieves a source identifier for a data source. For example, the system may, in response to the first request, retrieve, based on the first rule set, a first source identifier indicating a first data source location for the first rule set. In some embodiments, the system may continuously update the metadata that indicates a data source for a particular rule set. By doing so, the system may dynamically update the data that is used without affecting other programs or applications that are using the data source. Alternatively or additionally, a required data source may be recorded in the script of the code sample.

At step 410, process 400 (e.g., using one or more components described above) selects a data stream from a plurality of data streams at the data source. For example, the system may, in response to the first request, select, from a plurality of data streams at the first data source location, a first data stream based on the first data stream corresponding to the first pre-deployment code sample. For example, the system may provide rule sets with a specialized data retrieval process in which the rule set includes a source identifier for a data source for the first rule set, but the system may then select a data stream from a plurality of data streams at that data source for processing the pre-deployment code sample. By doing so, the system standardizes the application of a rule set to a pre-deployment code sample to use data at a given location (e.g., a data stream having a particular origin, date, and/or other characteristic), but allows for the sample itself to determine which data stream of the data streams at that data location is used. As such, the system avoids the need for the plethora of rule sets that would overwhelm a user and defeat the purpose of the CaaS product, but allows for processing pre-deployment code samples that are specific to the sample.

In some embodiments, the system may retrieve a data stream identifier that is included within the script of the pre-deployment code sample. For example, the data stream identifier may indicate a version, format, and/or other quantitative or qualitative description about a specific data stream that is required to process the code sample. For example, the system may retrieve a first data stream identifier from the pre-deployment code sample. The system may then determine that the first data stream identifier corresponds to the first data stream.

In some embodiments, the system may retrieve a data stream based on a type of code sample. For example, a code sample may be distinguished from other code samples based on one or more characteristics. These characteristics may be quantitative or qualitative descriptions of the sample and may indicate particular details about the code such as its function, an application of which it is a part, a required security level, a risk assessment, and/or other compliance metric needed to ensure validation. Additionally or alternatively, the characteristics may indicate a particular version, source, time stamp, and/or other origination information of a data stream that is required. The system may use these characteristics to then select a data stream corresponding to the characteristics (and/or a data stream that most closely matches the characteristics) from the plurality of data streams available at the data source location indicated by the rule set. For example, the system may determine a characteristic of the pre-deployment code sample. The system may generate a feature input based on the characteristic. The system may then input the feature input into an artificial intelligence model to select the first data stream, wherein the artificial intelligence model is trained to select data streams based on a comparison of inputted characteristics for code samples and known characteristics about the data streams.

At step 412, process 400 (e.g., using one or more components described above) processes the pre-deployment code sample. For example, the system may process the first pre-deployment code sample using the first rule set and the first data stream. The system may process the code to determine that the code is correct and/or the code is in compliance with the standards and recommendations set by one or more rule sets.

In some embodiments, the system may provide a user interface that allows for one or more control sets (e.g., rule sets) to be applied to code samples. When applying the rule sets to the code samples, the system may apply one or more conditions in the rule set to the code samples. For example, the system may determine, based on the first rule set, a first condition, wherein the first condition indicates a circumstance for executing the first rule set. The system may then determine, based on the first pre-deployment code sample, that the first condition is satisfied.

In some embodiments, determining, based on the first rule set, the first condition comprises determining whether or not a rule set applies to the code sample. For example, the system may determine which conditions are related to a rule set. The system may retrieve each of these conditions from the database. As such, the system may retrieve a first database record, wherein the first database record indicates a plurality of conditions corresponding to the first rule set. The system may retrieve, from the first database record, the plurality of conditions.

In some embodiments, the system may determine which conditions are related to a particular rule set. For example, the system may indicate specific rules and/or conditions that are required to apply controls to code samples. As such, when determining, based on the first rule set, the first condition, the system may retrieve a first database record, wherein the first database record indicates a plurality of rules corresponding to the first rule set. The system may determine a characteristic of the first pre-deployment code sample. The system may filter the plurality of rules based on the characteristic to select the first condition.

In some embodiments, determining, based on the first pre-deployment code sample, that the first condition is satisfied comprises the system determining, based on the first rule set, a first condition, wherein the first condition indicates a process executed by the first rule set, and processing, based on the first condition, the first pre-deployment code sample to generate the first processing confirmation. For example, at run-time, the system may determine which conditions are performed based on the first rule set. The system may then use the conditions to generate a result (e.g., whether or not the code was validated in view of the rule set) that may contribute to the processing confirmation.

In some embodiments, the rule set may define numerous characteristics about how and what data from the code sample is used. In some embodiments, the rule set may describe a format required by the code sample that causes the code sample to be reformatted. For example, the system may determine, based on the first rule set, a first format for the first pre-deployment code sample. The system may reformat the first pre-deployment code sample into the first format.

At step 414, process 400 (e.g., using one or more components described above) generates a first processing confirmation. For example, the system may generate for display, on a second user interface, a first processing confirmation for the first pre-deployment code sample. For example, the system may generate a recommendation that describes a result of the processing of the code sample with one or more rule sets. This result may comprise an indication that the code sample is in compliance with the rules in the rule set, a degree of compliance, and/or other information (e.g., instructions for editing the code sample in order to gain compliance).

In some embodiments, the system may receive multiple requests to process different streams or sets of input data. The system may generate a new rules engine session for each code sample. When generating the new rules engine session, the system may determine whether a location of a data stream to use has been updated based on an update to the source identifier. For example, the system may generate a second source identifier based on an update to the first source identifier. The system may receive a second request to process a second pre-deployment code sample using the first rule set. The system may, in response to the second request, retrieve the second source identifier indicating a second data source location for the first rule set and retrieve, based on the second source identifier, a second data stream from the second data source location. The system may process the second pre-deployment code sample using the first rule set and the second data stream. The system may generate for display, on the second user interface, a second processing confirmation for the second pre-deployment code sample.

In some embodiments, the system may receive additional requests that are based on updated information. For example, the system may, after generating for display the first processing confirmation, receive a version update to the first rule set. The system may store, in the plurality of versions of the first rule set, a second version of the plurality of versions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for continuous integration and continuous deployment pipeline management using pipeline-agnostic rule sets applied to pre-deployment code samples.
2. The method of the preceding embodiment, further comprising: receiving, via a first user interface, a first user input creating a first rule set for processing pre-deployment code samples; storing, in a rules engine, the first rule set; receiving a first request to process a first pre-deployment code sample using the first rule set; in response to the first request, retrieving, based on the first rule set, a first source identifier indicating a first data source location for the first rule set, and selecting, from a plurality of data streams at the first data source location, a first data stream based on the first data stream corresponding to the first pre-deployment code sample; processing the first pre-deployment code sample using the first rule set and the first data stream; and generating for display, on a second user interface, a first processing confirmation for the first pre-deployment code sample.
3. The method of any one of the preceding embodiments, wherein selecting, from the plurality of data streams at the first data source location, the first data stream based on the first data stream corresponding to the first pre-deployment code sample further comprises: retrieving a first data stream identifier from the first pre-deployment code sample; and determining that the first data stream identifier corresponds to the first data stream.
4. The method of any one of the preceding embodiments, wherein selecting, from the plurality of data streams at the first data source location, the first data stream based on the first data stream corresponding to the first pre-deployment code sample further comprises: determining a type of the first pre-deployment code sample; and determining that the type corresponds to the first data stream.

5. The method of any one of the preceding embodiments, wherein selecting, from the plurality of data streams at the first data source location, the first data stream based on the first data stream corresponding to the first pre-deployment code sample further comprises: determining a characteristic of the first pre-deployment code sample; generating a feature input based on the characteristic; and inputting the feature input into an artificial intelligence model to select the first data stream, wherein the artificial intelligence model is trained to select data streams based on a comparison of inputted characteristics for code samples and known characteristics about the data streams.

6. The method of any one of the preceding embodiments, wherein processing the first pre-deployment code sample using the first rule set and the first data stream comprises: determining, based on the first rule set, a first condition, wherein the first condition indicates a circumstance for executing the first rule set; and determining, based on the first pre-deployment code sample, that the first condition is satisfied.

7. The method of any one of the preceding embodiments, wherein determining, based on the first rule set, a first condition comprises: retrieving a first database record, wherein the first database record indicates a plurality of conditions corresponding to the first rule set; and retrieving, from the first database record, the plurality of conditions.

8. The method of any one of the preceding embodiments, wherein determining, based on the first rule set, a first condition comprises: retrieving a first database record, wherein the first database record indicates a plurality of rules corresponding to the first rule set; determining a characteristic of the first pre-deployment code sample; and filtering the plurality of rules based on the characteristic to select the first condition.

9. The method of any one of the preceding embodiments, wherein determining, based on the first pre-deployment code sample, that the first condition is satisfied comprises: determining, based on the first rule set, a first condition, wherein the first condition indicates a process executed by the first rule set; and processing, based on the first condition, the first pre-deployment code sample to generate the first processing confirmation.

10. The method of any one of the preceding embodiments, wherein processing the first pre-deployment code sample using the first rule set and the first data stream further comprises: determining, based on the first rule set, a first format for the first pre-deployment code sample; and reformatting the first pre-deployment code sample into the first format.

11. The method of any one of the preceding embodiments, further comprising: generating a second source identifier based on an update to the first source identifier; receiving a second request to process a second pre-deployment code sample using the first rule set; in response to the second request, retrieving the second source identifier indicating a second data source location for the first rule set, and retrieving, based on the second source identifier, a second data stream from the second data source location; processing the second pre-deployment code sample using the first rule set and the second data stream; and generating for display, on the second user interface, a second processing confirmation for the second pre-deployment code sample.

12. The method of any one of the preceding embodiments, wherein storing the first rule set comprises: storing a plurality of versions of the first rule set in a database; determining, in response to receiving the first request to process the first pre-deployment code sample using the first rule set, a first version of the plurality of versions; and using the first version to process the first pre-deployment code sample.

13. The method of any one of the preceding embodiments, further comprising: after generating for display the first processing confirmation, receiving a version update to the first rule set; and storing, in the plurality of versions of the first rule set, a second version of the plurality of versions.

14. The method of any one of the preceding embodiments, wherein storing the first rule set comprises: storing a plurality of versions of the first rule set in a database; and determining, based on the first request, a first version of the plurality of versions to process the first pre-deployment code sample.

15. The method of any one of the preceding embodiments, further comprising: while processing the first pre-deployment code sample, receiving a version update to the first rule set; and storing, in the plurality of versions of the first rule set, a second version of the plurality of versions.

16. A tangible, non-transitory, machine-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

We claim:

1. A system for continuous integration and continuous deployment pipeline management using pipeline-agnostic rule sets applied to pre-deployment code samples, the system comprising:
one or more processors; and
a non-transitory, computer-readable medium comprising instructions that, when executed by the one or more processors, cause operations comprising:
receiving, via a first user interface, a first user input creating a first rule set for processing pre-deployment code samples, wherein the first user input is entered into a first field of a plurality of fields, wherein the pre-deployment code samples comprise commits to a pre-deployment codebase, and wherein the commits await testing prior to integration with a code repository of deployed code;
generating, using an application programming interface (API) suite, the first rule set based on the first user input, wherein the API detects data stream identifiers present in scripts of the pre-deployment code samples;
storing, in a rules engine, the first rule set, wherein the first rule set is archived with a plurality of rule sets, and wherein the rules engine applies the plurality of rules sets to the commits to the pre-deployment codebase that are awaiting testing prior to integration with the code repository of deployed code;

receiving, via a second user interface, a first request to process a first pre-deployment code sample;
determining, using the API suite, to use the first rule set to process the first pre-deployment code sample;
in response to the first request:
  retrieving, based on the first rule set, a first source identifier indicating a first data source location for the first rule set; and
  selecting, from a plurality of data streams at the first data source location, a first data stream based on the first data stream corresponding to a first data stream identifier included in script comprising the first pre-deployment code sample;
processing, using the API suite, the first pre-deployment code sample using the first rule set and the first data stream to determine whether the script comprising the first pre-deployment code sample meets a requirement of the first rule set; and
generating for display, on the second user interface, a first processing confirmation for the first pre-deployment code sample, wherein the first processing confirmation indicates that the script comprising the first pre-deployment code sample meets the requirement of the first rule set.

2. A method for continuous integration and continuous deployment pipeline management using pipeline-agnostic rule sets applied to pre-deployment code samples, the method comprising:
receiving, via a first user interface, a first user input creating a first rule set for processing pre-deployment code samples, wherein the pre-deployment code samples comprise commits to a pre-deployment codebase, and wherein the commits await testing prior to integration with a code repository of deployed code;
storing, in a rules engine, the first rule set;
receiving, using an application programming interface (API) suite, a first request to process a first pre-deployment code sample using the first rule set, wherein the API suite detects data stream identifiers present in scripts of the pre-deployment code samples;
in response to the first request:
  retrieving, based on the first rule set, a first source identifier indicating a first data source location for the first rule set; and
  selecting, from a plurality of data streams at the first data source location, a first data stream based on the first data stream corresponding to the first pre-deployment code sample by:
    retrieving a first data stream identifier included in script comprising the first pre-deployment code sample; and
    determining that the first data stream identifier corresponds to the first data stream;
processing the first pre-deployment code sample using the first rule set and the first data stream to determine whether the script comprising the first pre-deployment code sample meets a requirement of the first rule set; and
generating for display, on a second user interface, a first processing confirmation for the first pre-deployment code sample, wherein the first processing confirmation indicates that the script comprising the first pre-deployment code sample met a requirement of the first rule set.

3. The method of claim 2, wherein selecting, from the plurality of data streams at the first data source location, the first data stream based on the first data stream corresponding to the first pre-deployment code sample further comprises:
determining a type of the first pre-deployment code sample; and
determining that the type corresponds to the first data stream.

4. The method of claim 2, wherein selecting, from the plurality of data streams at the first data source location, the first data stream based on the first data stream corresponding to the first pre-deployment code sample further comprises:
determining a characteristic of the first pre-deployment code sample;
generating a feature input based on the characteristic; and
inputting the feature input into an artificial intelligence model to select the first data stream, wherein the artificial intelligence model is trained to select data streams based on a comparison of inputted characteristics for code samples and known characteristics about the data streams.

5. The method of claim 2, wherein processing the first pre-deployment code sample using the first rule set and the first data stream comprises:
determining, based on the first rule set, a first condition, wherein the first condition indicates a circumstance for executing the first rule set; and
determining, based on the first pre-deployment code sample, that the first condition is satisfied.

6. The method of claim 5, wherein determining, based on the first rule set, the first condition comprises:
retrieving a first database record, wherein the first database record indicates a plurality of conditions corresponding to the first rule set; and
retrieving, from the first database record, the plurality of conditions.

7. The method of claim 5, wherein determining, based on the first rule set, the first condition comprises:
retrieving a first database record, wherein the first database record indicates a plurality of rules corresponding to the first rule set;
determining a characteristic of the first pre-deployment code sample; and
filtering the plurality of rules based on the characteristic to select the first condition.

8. The method of claim 5, wherein determining, based on the first pre-deployment code sample, that the first condition is satisfied comprises:
determining, based on the first rule set, a first condition, wherein the first condition indicates a process executed by the first rule set; and
processing, based on the first condition, the first pre-deployment code sample to generate the first processing confirmation.

9. The method of claim 2, wherein processing the first pre-deployment code sample using the first rule set and the first data stream further comprises:
determining, based on the first rule set, a first format for the first pre-deployment code sample; and
reformatting the first pre-deployment code sample into the first format.

10. The method of claim 2, further comprising:
generating a second source identifier based on an update to the first source identifier;
receiving a second request to process a second pre-deployment code sample using the first rule set;
in response to the second request:
  retrieving the second source identifier indicating a second data source location for the first rule set; and retrieving, based on the second source identifier, a second data stream from the second data source location;
processing the second pre-deployment code sample using the first rule set and the second data stream; and
generating for display, on the second user interface, a second processing confirmation for the second pre-deployment code sample.

11. The method of claim 2, wherein storing the first rule comprises:
storing a plurality of versions of the first rule set in a database;
determining, in response to receiving the first request to process the first pre-deployment code sample using the first rule set, a first version of the plurality of versions; and
using the first version to process the first pre-deployment code sample.

12. The method of claim 11, further comprising:
after generating for display the first processing confirmation, receiving a version update to the first rule set; and
storing, in the plurality of versions of the first rule set, a second version of the plurality of versions.

13. The method of claim 2, wherein storing the first rule comprises:
storing a plurality of versions of the first rule set in a database; and
determining, based on the first request, a first version of the plurality of versions to process the first pre-deployment code sample.

14. The method of claim 13, further comprising:
while processing the first pre-deployment code sample:
receiving a version update to the first rule set; and
storing, in the plurality of versions of the first rule set, a second version of the plurality of versions.

15. A non-transitory, computer-readable medium comprising instructions that, when executed by one or more processors, cause operations comprising:
receiving, via a first user interface, a first user input creating a first rule set for processing pre-deployment code samples, wherein the pre-deployment code samples comprise commits to a pre-deployment codebase, and wherein the commits await testing prior to integration with a code repository of deployed code;
storing, in a rules engine, the first rule set;
receiving a first request to process a first pre-deployment code sample using the first rule set;
in response to the first request:
retrieving, based on the first rule set, a first source identifier indicating a first data source location for the first rule set; and
selecting, from a plurality of data streams at the first data source location, a first data stream based on the first data stream corresponding to the first pre-deployment code sample by:
retrieving a first data stream identifier included in script comprising the first pre-deployment code sample; and
determining that the first data stream identifier corresponds to the first data stream;
processing the first pre-deployment code sample using the first rule set and the first data stream to determine whether the script comprising the first pre-deployment code sample meets a requirement of the first rule set; and
generating for display, on a second user interface, a first processing confirmation for the first pre-deployment code sample, wherein the first processing confirmation indicates that the script comprising the first pre-deployment code sample meets the requirement of the first rule set.

16. The non-transitory, computer-readable medium of claim 15, wherein selecting, from the plurality of data streams at the first data source location, the first data stream based on the first data stream corresponding to the first pre-deployment code sample further comprises:
determining a type of the first pre-deployment code sample; and
determining that the type corresponds to the first data stream.

17. The non-transitory, computer-readable medium of claim 15, wherein selecting, from the plurality of data streams at the first data source location, the first data stream based on the first data stream corresponding to the first pre-deployment code sample further comprises:
determining a characteristic of the first pre-deployment code sample;
generating a feature input based on the characteristic; and
inputting the feature input into an artificial intelligence model to select the first data stream, wherein the artificial intelligence model is trained to select data streams based on a comparison of inputted characteristics for code samples and known characteristics about the data streams.

18. The non-transitory, computer-readable medium of claim 15, wherein processing the first pre-deployment code sample using the first rule set and the first data stream comprises:
determining, based on the first rule set, a first condition, wherein the first condition indicates a circumstance for executing the first rule set; and
determining, based on the first pre-deployment code sample, that the first condition is satisfied.

* * * * *